(No Model.)
N. B. LE FEVRE.
BICYCLE STAND.
No. 594,748. Patented Nov. 30, 1897.
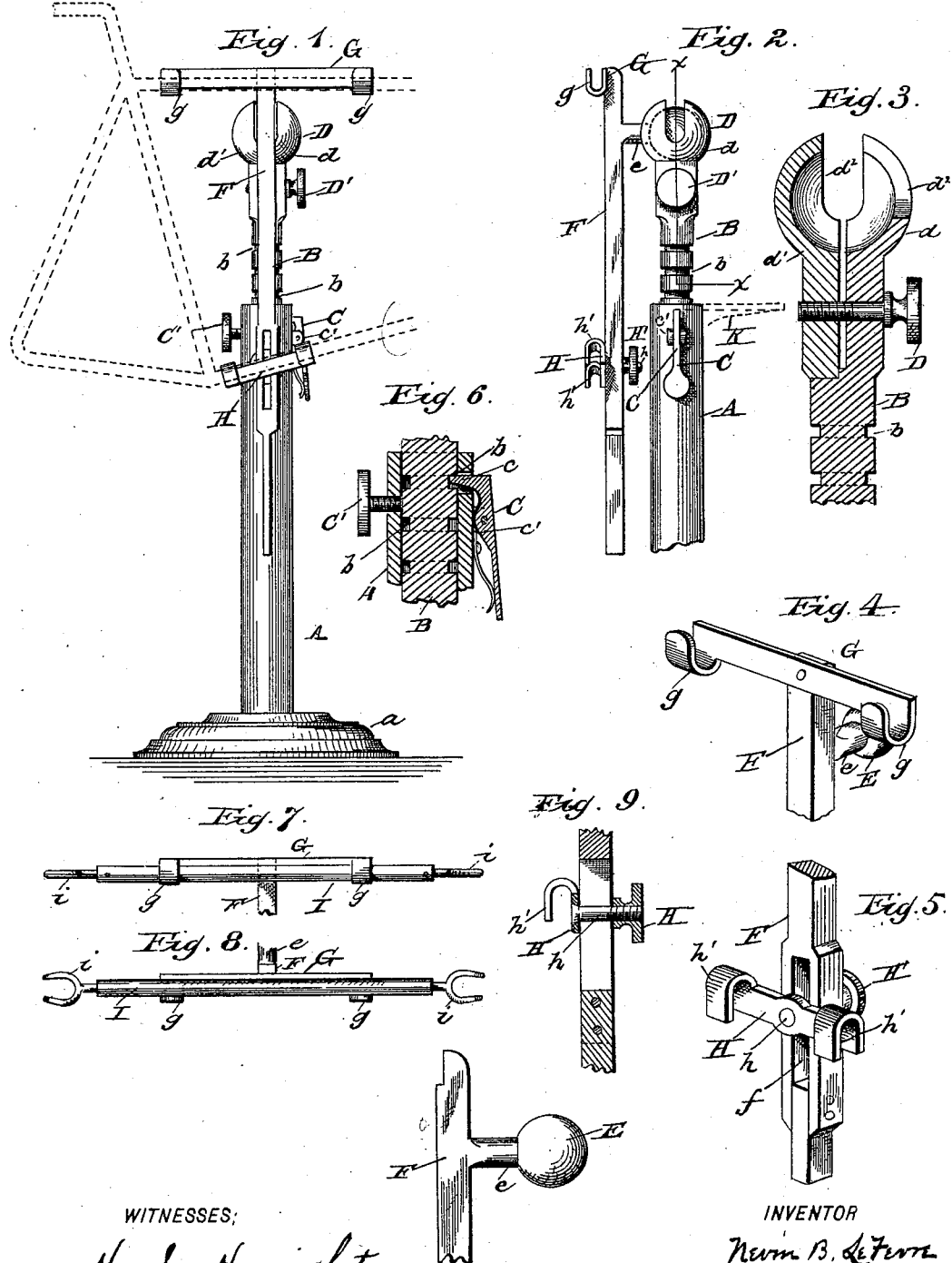
WITNESSES:
H. S. Knight.
G. M. Knight
INVENTOR
Newm B. LeFevre
BY
W. H. H. Knight
his ATTORNEY.

UNITED STATES PATENT OFFICE.

NEVIN BUFFINGTON LE FEVRE, OF LITTLESTOWN, PENNSYLVANIA, ASSIGNOR TO ZACHARIAH K. LOUCKS, OF PHILADELPHIA, PENNSYLVANIA.

BICYCLE-STAND.

SPECIFICATION forming part of Letters Patent No. 594,748, dated November 30, 1897.

Application filed June 22, 1895. Serial No. 553,745. (No model.)

*To all whom it may concern:*

Be it known that I, NEVIN BUFFINGTON LE FEVRE, a citizen of the United States, residing at Littlestown, in the county of Adams and State of Pennsylvania, have invented certain new and useful Improvements in Bicycle-Stands; and I do hereby declare the following to be a full, clear, and exact description of the invention, such as will enable others skilled in the art to which it appertains to make and use the same.

My invention relates to improvements in bicycle-stands, and has for its object the provision of a device of the class named having means for raising and lowering the bicycle to any desired distance from the floor or for swinging and holding it into and at any desired position in the horizontal or vertical planes, or at any angle thereto, without removing the bicycle from the stand, substantially as is hereinafter set forth, and illustrated in the accompanying drawings, wherein—

Figure 1 is a front elevation of my improved stand, showing in dotted lines a bicycle-frame thereon. Fig. 2 is a side elevation of a part of the stand shown in Fig. 1. Fig. 3 is a vertical section through the upper part of the standard, taken on the line $xx$ of Fig. 2. Fig. 4 is a detail perspective view of the upper part of the swinging arm detached from the stand and shows the upper fixed cross-arm or clamp for holding the bicycle in position. Fig. 5 is a similar detail perspective view of the lower part of the swinging arm and shows the lower movable clamp for holding the bicycle in position. Fig. 6 is a detail sectional view of the upper end of the tubular standard and shows the means employed to hold the vertically-moving shaft therein at any desired degree of elevation. Fig. 7 is a detached detail view of the upper end of the swinging arm and clamp thereon and shows a removable cross-arm held by said clamp and provided with stirrups to hold bicycles which do not have the upper brace-bar shown in Fig. 1. Fig. 8 is a top plan view of the parts shown in Fig. 7. Fig. 9 is a detached sectional detail through the lower part of the swinging arm and its attached bicycle-holding clamp to more clearly show the construction of said parts. Fig. 10 is a detail view of the upper part of the swinging arm.

Similar letters of reference in the several figures of the drawings denote similar parts.

The present invention contemplates the provision of a bicycle-stand which may be employed in a dual capacity—viz., as an ordinary stand or rest for bicycles and also for the purpose of holding a bicycle while repair is being made thereto, the latter function necessitates the employment of special devices whereby the bicycle may be readily and quickly turned to and firmly held at any desired angle to facilitate free access to all its parts. To provide a stand combining the qualities above named with simplicity, durability, and cheapness is therefore the purpose of this invention.

In carrying out my invention I provide a substantial tubular standard A, constructed of iron or other suitable material, with a base or foot $a$ having a weight and area sufficient to hold the standard A firmly in an upright position and with a vertically-moving shaft B, which is adapted to move freely within the standard A and is provided with encircling grooves $b$ to receive the projecting end $c$ of a spring-pressed pawl C, which is journaled between lugs $c'$ at or near the upper end of the standard A by which the shaft B is held at any degree of elevation in the standard A. A thumb-screw $C'$ in the standard opposite the pawl C operates to hold the shaft B firmly in position in said standard A.

I provide the shaft B at its upper end with a socket D, having a section $d$ integral with said shaft B and a section $d'$ movable and connected to said fixed section $d$ by a thumb-screw $D'$.

I provide the socket D with cut-away portions $d^2$ to receive a stud $e$, that projects from the swinging arm F and is provided at its outer end with a ball E, that is placed and works within the socket D. (See Figs. 1 and 2.)

G designates a cross-arm that is rigidly connected to the swinging arm F, at the upper end thereof, and is provided at its opposite ends with upwardly-turned hooks $g$ (see Figs. 1, 2, and 4) to receive the upper brace-bar of a bicycle, as shown by dotted lines in Fig. 1.

I provide the swinging arm F at or near its middle with a slot $f$, through which a screw-threaded bolt $h$ extends from a cross-arm H, which is placed and moves upon the swinging arm F and is provided at its ends with downwardly-turned hooks $h'$ to receive the lower brace-bar of the bicycle. As shown in Fig. 1, a thumb-screw H' on the bolt H operates to hold the cross-arm H at any point of adjustment on the swinging arm F.

In Figs. 7 and 8 I show a hollow shaft I in position in the hooks $g$ of the cross-arm G and provided with stirrups $i$ similar to those shown in my pending application, Serial No. 543,383. This latter-described arrangement of the hollow shaft I and arm G is employed to hold bicycle-frames which have no upper brace-bar, as has that shown by dotted lines in Fig. 1.

When using my herein-described stand, the upper brace-bar of the bicycle is placed in the hooks $g$ of the cross-arm G, as shown in Fig. 1. The lower cross-arm H is now moved downward and its hooks $h'$ into contact with and embracing the lower brace-bar of the bicycle, as shown in said Fig. 1, and secured in such position by means of the thumb-screw H'. It will be readily apparent that the bicycle thus secured to the arm F may through the ball-and-socket connection of said arm F with the shaft B be readily swung to any angle with said shaft B and be securely held at such angle by means of the thumb-screw D' to facilitate repairs to the bicycle thereon.

If desired, a shelf (shown by dotted lines at K, see Fig. 2) may be connected to the upper end of the tubular standard A to hold tools, &c., within easy reach of a workman.

From the foregoing description it will be apparent that the device shown will operate effectually to hold a bicycle rigidly fixed at any angle required to facilitate repairs thereto, or when set in position shown in Figs. 1 and 2 will operate in an equally satisfactory manner as an ordinary rest to hold a bicycle in upright position.

Having thus described my invention, I claim and desire to secure by Letters Patent—

In a bicycle-stand, a standard having a two-part socket, connected by a screw, a swinging arm F, to hold a bicycle, said arm having a cross-head G, rigid therewith and provided with hooks $g$, and a cross-head H, movably connected thereto and provided with hooks $h'$, a ball rigidly connected to said arm F, to engage the socket upon the standard, and hold said arm F, at different angles with said standard, substantially as described.

In testimony whereof I have affixed my signature in presence of two witnesses.

NEVIN BUFFINGTON LE FEVRE.

Witnesses:
JAMES W. OCKER,
COOK DUNKINSON.